Figure 7:
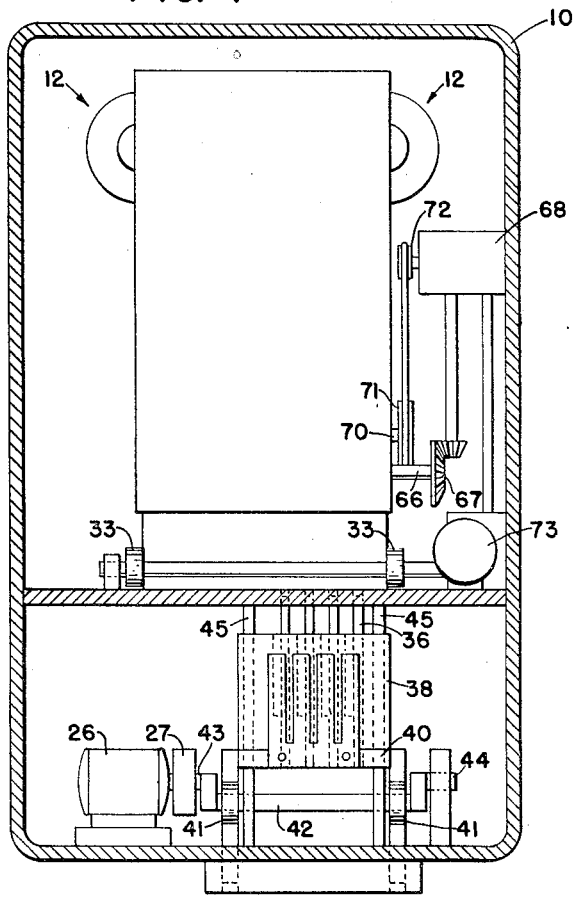

Oct. 9, 1956 — L. G. SIMJIAN — 2,765,717
CAMERA
Filed Nov. 7, 1955 — 4 Sheets-Sheet 1
FIG. 1
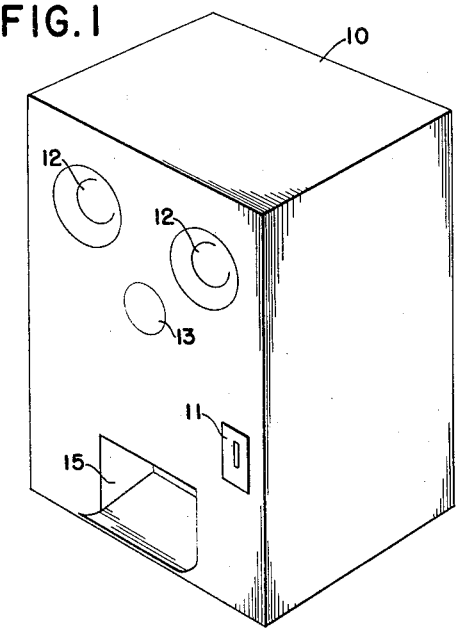
FIG. 2
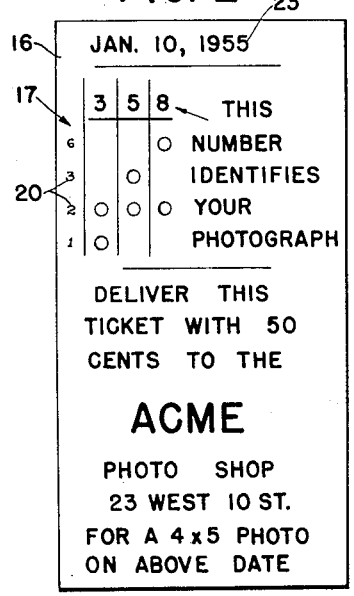
FIG. 3
| | | | | | | | |
|---|---|---|---|---|---|---|---|
| LIGHTS | | ON / OFF | | | | | |
| LENS SHUTTER | | OPEN / CLOSED | | | | | |
| MOTORS | | | ON | | | | OFF |
| FILM CLUTCH | | | | | ENGAGED | | |
| PUNCH CLUTCH | | | ENGAGED | | | | |
| CARD STOP | | | | | UP / DOWN | | |
| PICKER KNIFE | | | | | | | |
| DATE STAMP | | | | | | | |
LUTHER G. SIMJIAN
INVENTOR
BY Ralph E. Bitner
ATTORNEY Oct. 9, 1956   L. G. SIMJIAN   2,765,717
CAMERA
Filed Nov. 7, 1955   4 Sheets-Sheet 2
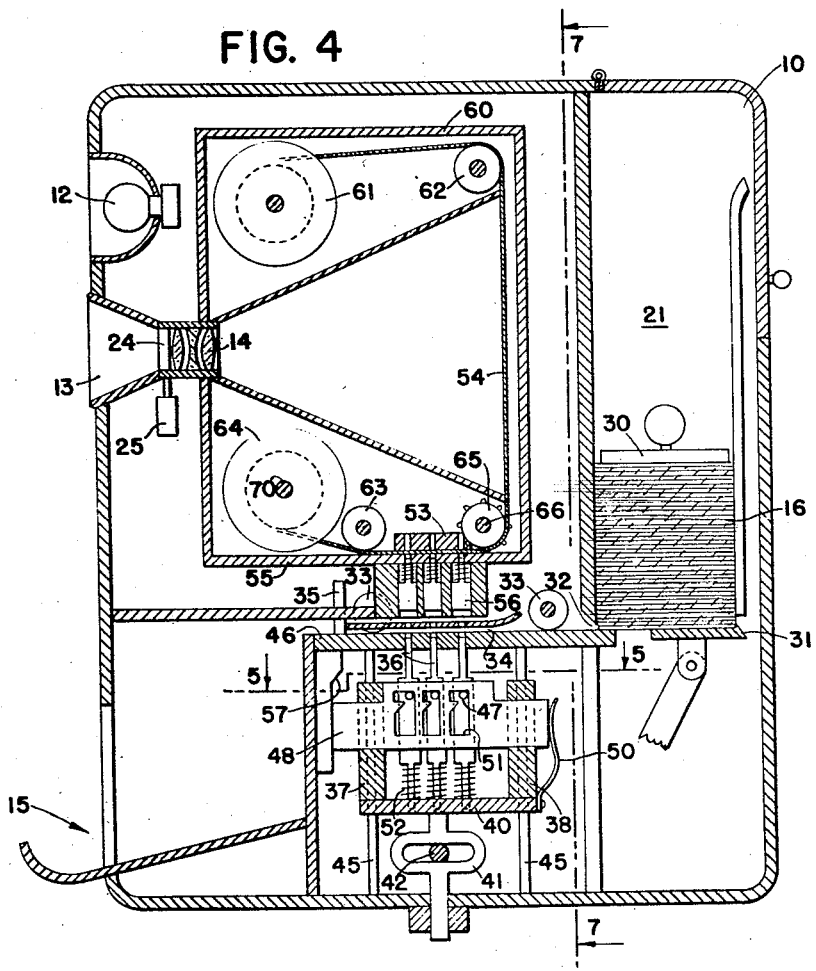
LUTHER G. SIMJIAN
INVENTOR
BY Ralph E. Bitner
ATTORNEY Oct. 9, 1956 — L. G. SIMJIAN — 2,765,717
CAMERA
Filed Nov. 7, 1955 — 4 Sheets-Sheet 3

LUTHER G. SIMJIAN
INVENTOR

BY Ralph E. Bitner
ATTORNEY

Oct. 9, 1956 L. G. SIMJIAN 2,765,717
CAMERA
Filed Nov. 7, 1955 4 Sheets-Sheet 4

LUTHER G. SIMJIAN
INVENTOR

BY Ralph E. Bitner
ATTORNEY

United States Patent Office 2,765,717
Patented Oct. 9, 1956

2,765,717
CAMERA
Luther G. Simjian, Greenwich, Conn.
Application November 7, 1955, Serial No. 545,240
10 Claims. (Cl. 95—1.1)

This invention relates to a camera which includes automatic operating features which identify a film exposure in relation to a punched data card. It has particular reference to a means for punching holes in a film or otherwise identifying a film exposure to correspond with a data card which contains information punched therein in addition to other information which identifies an object photographed.

Many types of automatic cameras have been developed and put into use. Some of these machines are fully automatic and include the operations of taking a picture, developing and fixing a film, and then delivering a photograph to the purchaser. Such cameras are convenient and fast but the pictures they produce are generally wet and not of high quality. In addition, the photograph film is delivered to the purchaser in the form of a picture and there is no permanent record preserved from which another photograph may be reproduced. The present invention overcomes many of these difficulties. A series of punched cards is first punched with holes which identify a number. Before the picture is taken, or directly after the exposure, other information, such as the address of the person photographed, is placed on the card. The prepunched cards are placed in a hopper back of the camera and when a photograph is taken the same identifying punch marks that are in the card are punched in the film. Such a procedure identifies the film with the card. The card may be issued to the purchaser at the time the film is exposed. The purchaser later receives one or more enlarged photographic prints by presenting the card to a photographic laboratory. Because the film is developed in a laboratory and enlargements are made under controlled laboratory conditions, the resulting prints can possess the high quality usually found in studio portraits.

One of the objects of this invention is to provide an improved camera which avoids one or more of the disadvantages and limitations of prior art arrangements.

Another object of the invention is to provide a simplified camera which can be used by the public to take portraits.

Another object of the invention is to provide a camera which has many automatic features but does not employ liquids for its operation.

Still another object of the invention is the provision of a photographic negative which is available to skilled laboratory personnel for rendering the best possible print.

Another object of the invention is to insure positive identification of a film by mechanically punching the film with identifying data which has been prepunched on a data card.

Another object of the invention is to simplify the handling and storage of a large number of photographic films by the use of tabulating and sorting machines which can process punch data cards with speed and accuracy.

Another object of the invention is to simplify and improve the operation of coin operated cameras by issuing an identifying ticket immediately after a picture has been taken.

The invention comprises a coin operated camera which includes a lens and a support for a sensitized film. At one side of the camera box a stack of prepunched cards is mounted which are used for punching identifying holes in the film immediately after the picture is taken. After the picture has been taken, the film is wound on a spool in a storage chamber and the card is stamped with the date and delivered to an operator.

For a bteter understanding of the present invention, together with other and further objects thereof, reference is made to the following description taken in connection with the accompanying drawings.

Figure 8:
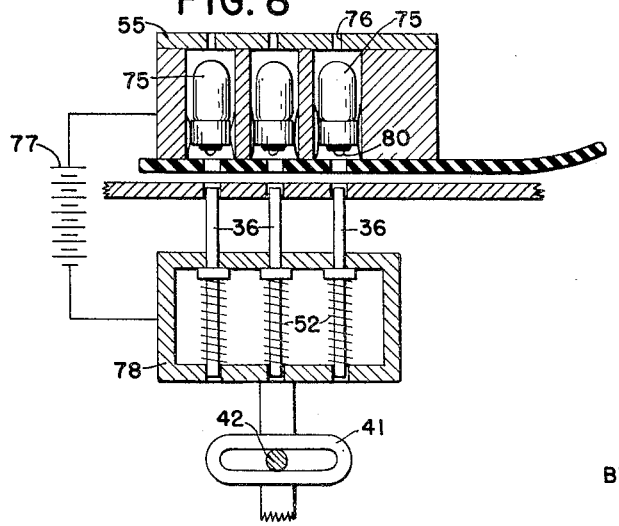
Figure 9:
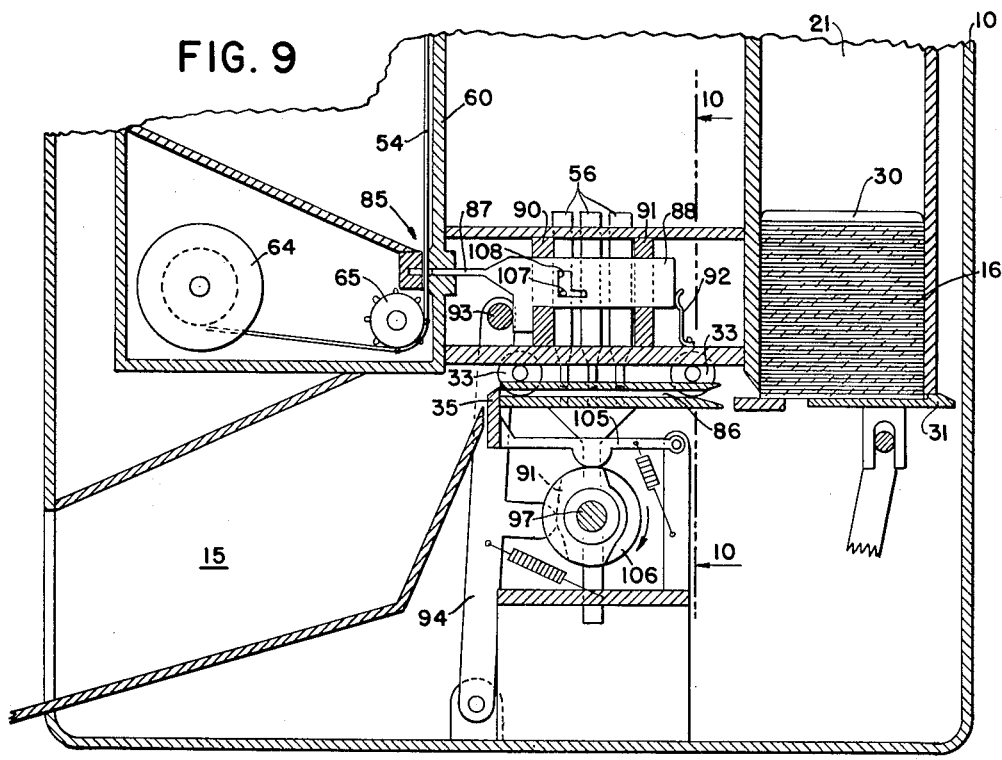
Figure 10:
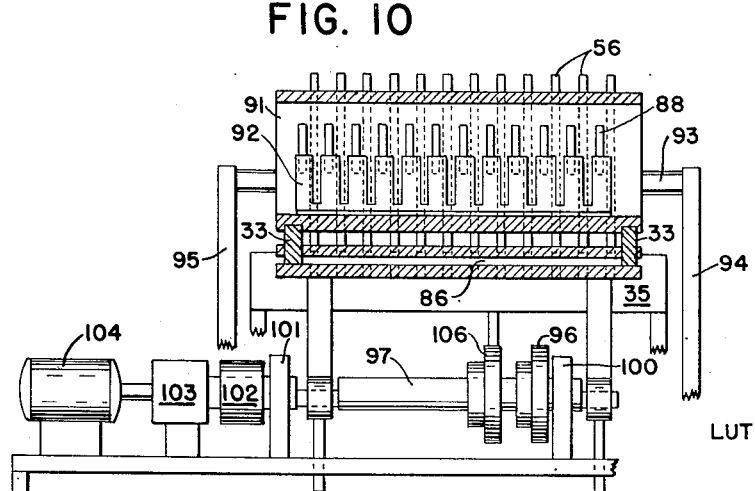

Fig. 1 is a perspective view of the camera.
Fig. 2 is a plan view of the prepunched card issued to the person who has been photographed.
Fig. 3 is a timing diagram illustrating the operation of the various machine components.
Fig. 4 is a cross sectional view of the camera and shows in schematic form the card sensing device and the film punch.
Fig. 5 is a cross sectional view of a portion of the sensing device shown in Fig. 4 and is taken along line 5—5 of that figure.
Fig. 6 is a side view indicating the position taken by a person whose photograph is to be taken.
Fig. 7 is a cross sectional view of the camera shown in Fig. 4 and is taken along line 7—7 of that figure.
Fig. 8 is a cross sectional view of a sensing chamber similar to that shown in Fig. 4 but using small lamps.
Fig. 9 is a cross sectional view of an alternate form of the machine.
Fig. 10 is a cross sectional view of a portion of the apparatus shown in Fig. 9, taken along line 10—10 of Fig. 9.

Referring now to the figures, a camera box 10 contains all the necessary components for the operation which includes taking a picture and issuing an identifying punched card. The camera is generally operated by a coin mechanism but this is not necessary when it is desired to have an operator in attendance. Fig. 1 shows a coin slot 11 for receiving a coin to operate the machine. The coin operating mechanism is not shown in the drawings since these devices are old in the art and have been well developed. The camera also contains two or more lamps 12 which may be lighted just prior to taking a picture. A lens aperture 13 is positioned adjacent to the lamps for admitting light to a camera lens 14. Just below the lens aperture 13 is a compartment 15 for issuing a card which bears a series of identifying punch marks corresponding to similar punch marks on the film.

The details of ticket 16 are shown in Fig. 2 and include an identifying area 17 reserved for punch marks which will identify the card and a corresponding film exposure. The number shown in Fig. 2 (358) is coded and is represented by a four position code having position values of 1, 2, 3, and 6. Any four position code may be used, or any other core, or a complete set of 10 positions may be employed. These holes are prepunched and are generally in sequence although any desired combination of numbers may be employed. A series of small numbers 20 may be placed adjacent to the holes to aid in the rapid evaluation of the coded number but this is not necessary. The tickets may be part of a continuous strip stored in a roll within the box 10 and cut into separate cards just before being issued, or they may be precut and stored in a vertical storage chamber 21 (see Fig. 4). At the top of the card is an area reserved for a date 23 which is stamped on the card just before being delivered to compartment 15 where it is available to the operator of the machine. The ticket is made large enough so that it may also contain detailed instructions for obtaining the finished photograph.

Fig. 3 indicates in a general manner the sequential operation of the camera mechanism. The machine is started by an operator or by a coin inserted into slot 11 and shortly after the initial actuation, the lights are turned on, and a short time interval after that a lens shutter 24 in front of a lens 14 is operated by an electromagnetic device 25. At the same time the shutter is opened, or slightly before, a motor 26, positioned at the base of the machine, starts running but does not cause the actuation of any camera component because a punch clutch 27 and a film clutch 68 are initially disengaged. As indicated by the timing diagram the motor continues to run until the end of the operating cycle.

Operation of the lens shutter 24 completes the picture taking cycle and the remainder of the camera operation includes sensing the holes in a punch card, punching the same holes in a portion of the film, delivering the card to a compartment 15, and moving a portion of the unexposed film into the camera focal plane for the next picture. The camera operation also includes the insertion of another card in the sensing chamber and the stamping of a date on the card at the same time the holes are punched in the film. Some of the details enumerated above are described in a United States Patent No. 2,699,100, issued January 11, 1955, to J. G. Simjian. Other details may be found in United States application No. 472,062, filed November 30, 1954, by L. G. Simjian, now Patent No. 2,737,095.

Fig. 4 shows the details of the card sensing and film punching mechanism. The cards are placed in a hopper 21 and held in place by a weight 30. At the bottom of the hopper a picker knife 31 is arranged to detach a single card from the bottom and pass it through a throat 32. Details of the mechanism which controls the operation of the picker knife are shown because these are well-known and have been used for a long time in tabulating and sorting machines which handle punched data cards. As soon as the card is ejected from the hopper, a set of card rollers 33 engage it and run it into a sensing chamber 34 where it comes to rest after limiting against a movable card stop 35. In this position the card is ready for the sensing operation.

The sensing mechanism includes a plurality of sensing pins 36 which are mounted in a box-like container having sides 37 and 38 and a base portion 40. The container is moved up and down by a scotch yolk 41 which is engaged by an eccentric shaft 42 secured to journaled stub shafts 43 and 44. Shaft 43 is secured directly to the punch clutch 27 which rotates for one revolution during the sensing and punching operation. The sensing container slides on four vertical rods 45 which are secured to the bottom of the camera case and a base plate 46 which forms the bottom of the card sensing chamber. Sensing pins 36 are formed with intermediate flat portions which contain an extrusion 47 extending into the path of one of a plurality of locking slides 48. Slides 48 are slidably mounted in sides 37 and 38 and are resiliently urged toward the front of the machine by one of a series of tines on a comb spring 50. Each locking slide is formed with a cut-out portion 51 which engages extrusions 47. Each sensing pin 36 is provided with a light spring 52 which urges it in an upward direction.

Directly above the sensing chamber is a punching mechanism for punching identifying holes in the photographic film. The punching mechanism comprises an upper plate 53 which contains holes in which the cut portions of the film are sheared. The photographic film 54 passes directly beneath the punch block 53 and directly above the base of the camera box 55 through which the punches operate. Holes are punched in the film by a plurality of punches 56, each resiliently engaged by its own spring to move away from the film after the punching operation.

The operation of the sensing and punching mechanism is as follows: When a punching operation is started, clutch 27 (Fig. 7) is engaged and eccentric shaft 42 moves scotch yolks 41 in an upward direction and moves the sensing pins up into the sensing chamber. When one of the pins 36 senses a hole in the punched card 16, it passes through the card, being held in this position by spring 52. When one of the sensing pins senses the absence of a hole its upward motion is stopped by the card and spring 52 is compressed. A short distance after the penetration of the sensing pins in the card holes the locking slides 48 engage a cam surface 57 and all the locking slides are pushed to the rear of the machine moving against springs 50. All the sensing pins which have entered the card will be locked into their upper position by small teeth formed at one side of openings 51 and are thereby locked in this position for further upward movement. All the sensing pins which were restrained in their upward movement by the card are not engaged by these teeth because the sensing pins are relatively depressed in relation to the teeth and when the locking slide is cammed to the rear of the machine the teeth will pass above extrusions 47 and will not be locked. As the sensing pins are further moved in an upward direction they engage punch elements 56 and move these punches up through the film 54. It will be obvious that considerable power is available for the punching operation since all the sensing pins which have passed through the card are locked into their upper position by locking slides 48 and therefore receive the full power transmitted from eccentric 42. When the sensing pins are normalized by the full rotation of shaft 43, the relative position of the sensing pins which penetrated holes in the card with respect to the locking slides is unchanged. The sensing pins which did not sense holes in the card are moved to their normal positions by springs 52 and the locking slides 48 are returned to their normal positions by springs 50.

The photographic film is mounted within a camera box 60, the unused portion being stored on a spool 61. The film 54 is threaded over idler rollers 62 and 63 and is wound on a second spool 64. A power-driven roller 65, contains small cogs which fit into perforations cut in the edges of the film and move the film a predetermined distance after each exposure has been made. Roller 65 is run by shaft 66 and gear 67 (Fig. 7) which is coupled to a gear box and clutch 68. Storage spool 64 is secured to a shaft 70 which is turned by a friction wheel 71 being belt-coupled to another wheel 72 which is run by the mechanism in gear box 68 and retains the films 54 in the punch chamber under constant tension.

The operation of the picture taking mechanism is controlled by an operating cam (not shown) which operates contacts to perform the functions as indicated in the timing diagram shown in Fig. 3. As soon as the sequence is started the lights are turned on and motors 26 and 73 are started. A short time interval after the lights have been lighted, the lens shutter is opened and closed, exposing the film and taking a picture of an object placed in front of the lens. Then the lights are turned off and the punch clutch 27 is operated, turning shaft 43 a single revolution, and punching identifying holes in the film corresponding to the holes punched in the card in the sensing chamber. During this time a date is stamped on the card to identify the time when a photograph will be ready. After the punch operation, the card stop 35 is raised and the card is rolled into compartment 15 by rollers 33. During this operation the clutch in gear box 68 is engaged and shaft 66 is turned an amount which will remove the exposed portion of the film 54 from the exposure position and present a new and unexposed portion of the film to the camera lens. During the later operation the picker knife 31 moves toward the front of the machine to push a new card below revolving rollers 33 and then returns to its original position as indicated in Fig. 4. This puts a new card into the sensing chamber and the machine is ready for another picture taking operation. The motors may be turned off at this time or they may be left running.

The above described mechanism punches holes in a photographic film which positively identifies each picture with a prepunched data card. It is not necessary to punch holes in the film but instead small round areas may be exposed on the film to take the place of the punched holes. A device for doing this is shown in Fig. 8 where a plurality of small lamps 75 take the place of punches 56. The lamps are positioned in small cavities just below plate 55 which forms a portion of the camera box. An aperture 76 permits light from the lamps to shine on the film and expose the proper areas. Current for the lamps is obtained from a source of potential 77 which is connected between the lamp housing and a box-like housing 78 which holds the sensing pins. In this alternate arrangement locking slides 48 are not necessary and the sensing pins 36 are moved upwardly under control of springs 52. When the tops of the sensing pins make contact with terminals 80 the lamps are lighted and the film is exposed.

The above described devices employ prepunched cards and punch similar holes in the film. It will be obvious that the film may be prepunched and this information transferred to cards or tickets. Figs. 9 and 10 illustrate how this can be done. The camera comprises an enclosing box 10, a card hopper 21 in which are stored unpunched cards 16 held down by a weight 30 and moved into a punching chamber by a picker knife 31. The camera box includes a light-tight partition 60, a film 54, as shown in Fig. 4, a sprocket wheel 65, and a take-up spool 64. This alternate design includes a film sensing chamber 85 where the prepunched holes are sensed. This arrangement also includes a card punch chamber 86 and means for moving the punching chamber up against punches 56 to punch holes in the card. A card stop 35 retains the card in the punch chamber until after the punching operation and then it is rolled into a card compartment 15 where it is made available to the operator of the machine.

The holes in the film are sensed by a plurality of sensing pins 87 each of which is secured to a sensing slide 88, slidably arranged in two vertical partitions 90 and 91. Sensing slides 88 are resiliently urged toward the film by the tines in a comb spring 92. Prior to the sensing operation the sensing pins and slides are held in their normal position by a bail 93 which extends across the entire sensing chamber and is secured to two end peices 94 and 95 which are pivoted at the base of the machine. Bail 93 is moved by a cam 96 which is secured to a shaft 97, journaled in bearings 100 and 101. Shaft 97 is connected to a one-revolution clutch 102 and a gear box 103, this part of the mechanism being actuated by a motor 104. The stop 35 is connected to a lever 105 and is operated by a cam 106 which is also secured to shaft 97.

Each of the slides contains a cut-out portion 108 which cooperates with an extrusion 107 on the punches 56. When the sensing slides are released by bail 93 and do not sense a hole in film, the extrusion 107 on punches 56 can be moved upwardly without making contact with any portion of the sensing slide, therefore when a hole in the film is not sensed, and the card chamber is moved upwardly, the punches 56 are raised by the card without any punching operation. If, however, a hole is sensed in the film, slides 88 move to the left so that extrusion 107 is positioned below the step portion of hole 108, and then when the punch chamber is moved up, the punch 56 is held in its punch position and a hole is punched in the card.

After the punching operation, the punch chamber is moved to its normal position and stop 35 is lowered, releasing the card to compartment 15. At this same time bail 93 is moved to the right as shown in Fig. 9 and all the sensing pins 87 are withdrawn from the film holes, thereby permitting the film winding mechanism to wind up the film and present an unexposed portion to the position behind the lens.

The operations of moving the cards into the punching chamber, moving the films, lighting the lamps, and operating the shutter are the same as disclosed in the description relating to Figs. 4, 5, 6, and 7.

In the arrangement shown in Fig. 9 all the prepunched holes in the film are in a single line across the width of the film. The punched holes in the data cards are arranged in a slightly different manner than those shown in Fig. 2 but the coding is the same.

While there have been described and illustrated specific embodiments of the present invention, it will be obvious that various modifications and changes may be made in the camera without departing from the field of the invention which should be limited only by the scope of the appended claims.

What is claimed is:

1. A photographic apparatus in combination with card identifying and card dispensing means comprising, a camera for photographically recording on a sensitized film the image of an object disposed in front of the camera, mechanical means for transferring identifying data between said film and said card, a card storing means operatively connected to said camera, and means for dispensing the identified card to a position exterior of the apparatus in response to an exposure actuating operation.

2. A photographic apparatus in combination with card identifying and card dispensing means comprising, a camera for photographically recording on a sensitized film in a focal plane the image of an object disposed in front of the camera, means for illuminating the object, mechanical means for transferring identifying data between said film and said card, a card storing means operatively connected to said camera, and means for dispensing the identified card to a position exterior of the apparatus in response to an exposure actuating operation.

3. A photographic apparatus in combination with card identifying and card dispensing means comprising, a camera for photographically recording on a sensitized film in a focal plane the image of an object disposed in front of the camera, means for illuminating the object, mechanical means for transferring identifying data between said film and said card, a card storing means operatively connected to said camera, means for dispensing the identified card to a position exterior of the apparatus in response to an exposure actuating operation, and means for moving a second card and the film to a position where new identifying data is transferred between the film and the second card.

4. A photographic apparatus in combination with card identifying and card dispensing means comprising, a camera for photographically recording on a sensitized film in a focal plane the image of an object disposed in front of the camera, said camera including a lens and a shutter, a plurality of cards stored within the apparatus, means for illuminating the object, mechanical means for transferring identifying data between said film and said card, and card translating means which moves a card from a storage compartment to a position where identifying data may be transferred between the film and the card and then dispenses the card to a position exterior of the apparatus in response to an exposure actuating operation.

5. A photographic apparatus in combination with card identifying and card dispensing means in accordance with claim 4 wherein the camera includes a means controlled by an operator for opening said shutter to expose the film and for mechanically transferring identifying data between the film and the card.

6. A photographic apparatus in combination with card identifying and card dispensing means in accordance with claim 4 wherein said dispensing means includes a means for stamping a date on said card before it is dispensed to said exterior position.

7. A photographic apparatus in combination with card identifying and card dispensing means comprising, a camera for photographically recording on a sensitized film the image of an object disposed in front of the camera, mechanical means for transferring identifying data from the card to the film, a card storing means operatively connected to said camera, and means for dispensing the identified card to a position exterior of the apparatus in response to an exposure actuating operation.

8. A photographic apparatus in combination with card identifying and card dispensing means comprising, a camera for photographically recording on a sensitized film the image of the object disposed in front of the camera, mechanical means for transferring identifying data from the film to the card, a card storing means operatively connected to said camera, and means for dispensing the identified card to a position exterior of the apparatus in response to an exposure actuating operation.

9. A photographic apparatus in combination with card identifying and card dispensing means comprising, a camera for photographically recording on a sensitized film the image of an object disposed in front of the camera, mechanical means for transferring prearranged identifying data from the card to the film, a card storing means operatively connected to said camera, and means for dispensing the identified card to a position exterior of the apparatus in response to an exposure actuating operation.

10. A photographic apparatus in combination with card identifying and card dispensing means comprising, a camera for photographically recording on a sensitized film the image of the object disposed in front of the camera, mechanical means for transferring prearranged identifying data from the film to the card, a card storing means operatively connected to said camera, and means for dispensing the identified card to a position exterior of the apparatus in response to an exposure actuating operation.

No references cited.